United States Patent
Wirola et al.

(10) Patent No.: US 8,982,716 B2
(45) Date of Patent: Mar. 17, 2015

(54) PROVIDING POSITIONING ASSISTANCE DATA

(75) Inventors: Lauri Wirola, Tampere (FI); Ismo Halivaara, Tampere (FI); Jari Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/736,515

(22) PCT Filed: Apr. 14, 2008

(86) PCT No.: PCT/EP2008/054505
§ 371 (c)(1),
(2), (4) Date: Oct. 13, 2010

(87) PCT Pub. No.: WO2009/127242
PCT Pub. Date: Oct. 22, 2009

(65) Prior Publication Data
US 2011/0032859 A1    Feb. 10, 2011

(51) Int. Cl.
| H04W 24/00 | (2009.01) |
| H04H 20/74 | (2008.01) |
| H04L 12/26 | (2006.01) |
| G06F 17/30 | (2006.01) |
| G01S 19/05 | (2010.01) |
| G01S 19/25 | (2010.01) |

(52) U.S. Cl.
CPC ............... *G01S 19/258* (2013.01); *G01S 19/05* (2013.01); *Y10S 707/919* (2013.01); *Y10S 707/922* (2013.01)
USPC ........... 370/252; 370/312; 370/351; 370/432; 707/609; 707/919; 707/922

(58) Field of Classification Search
CPC ....................................................... H04B 7/22
USPC ................ 370/310, 312, 432, 464, 465, 475; 455/39, 500, 507, 509, 516; 342/357.44
See application file for complete search history.

(56) References Cited

U.S. PATENT DOCUMENTS

| 6,324,473 | B1 | 11/2001 | Eschenbach |
| 6,806,814 | B1 * | 10/2004 | Iverson et al. ................. 340/8.1 |
| 7,181,247 | B1 * | 2/2007 | Melick et al. ............. 455/562.1 |

(Continued)

FOREIGN PATENT DOCUMENTS

| EP | 1203965 A1 | 5/2002 |
| EP | 1906197 A1 | 4/2008 |
| WO | 2007040375 A1 | 4/2007 |

OTHER PUBLICATIONS

3GPP TS 25.331 v7.7.0 (Dec. 2007), 3rd Generation Partnership Project; Technical Specification Group Radio Access Network; Radio Resource Control (RRC); Protocol Specification (Release 7), Cover page,Table of Contents pp. 3-31, and Chapter 10.2.48.8.18 (System Information Block type 15) at pp. 542-547, Jan. 3, 2007, 36 pages.

(Continued)

*Primary Examiner* — Omar Ghowrwal
(74) *Attorney, Agent, or Firm* — Alston & Bird LLP

(57) ABSTRACT

For supporting the use of positioning assistance data, the positioning assistance data is broadcast in a plurality of different logical sub-channels. The positioning assistance data is distributed to the plurality of different logical sub-channels depending on its content.

20 Claims, 4 Drawing Sheets

(56) References Cited

U.S. PATENT DOCUMENTS

| | | | | |
|---|---|---|---|---|
| 2004/0264475 | A1* | 12/2004 | Kowalski | 370/395.5 |
| 2005/0125493 | A1 | 6/2005 | Chaskar et al. | |
| 2005/0210292 | A1* | 9/2005 | Adams et al. | 713/201 |
| 2006/0194591 | A1* | 8/2006 | Xiong et al. | 455/456.2 |
| 2007/0218925 | A1* | 9/2007 | Islam et al. | 455/466 |
| 2007/0268860 | A1* | 11/2007 | Taneja | 370/329 |
| 2008/0062906 | A1* | 3/2008 | Baker et al. | 370/315 |
| 2008/0170516 | A1* | 7/2008 | Carmon et al. | 370/310 |
| 2011/0001668 | A1* | 1/2011 | Cobb et al. | 342/458 |

OTHER PUBLICATIONS

3GPP TS 44.031 v7.8.0 (Mar. 2008), 3rd Generation Partnership Project; Technical Specification Group GSM/EDGE Radio Access Network; Location Services (LCS); Mobile Station (MS)-Serving Mobile Location Centre (SMLC), Radio Resource LCS Protocol (RRLP) (Release 7), Cover page and Table of Contents at pp. 1-4, and Annex-A.4 (Assistance Data) at pp. 77-119, Mar. 20, 2008, 47 pages.

3GPP TS 44.035 v7.0.0 (Sep. 2007), 3rd Generation Partnership Project; Technical Specification Group GSM EDGE Radio Access Network; Location Services (LCS); Broadcast network assistance for Enhanced Observed Time Difference (E-OTD) and Global Positioning System (GPS) positioning methods (Release 6), whole document, Sep. 25, 2007, 34 pages.

3GPP2 C.S0022-A, Version 1.0, Date: Mar. 2004, Position Determination Service for cdma2000 Spread Spectrum Systems, whole document, 298 pages.

Enabler Release Definition for Secure UserPlane for Location (SUPL), Draft Version 2.0-08 Oct. 2007; Open Mobile Alliance, OMA-ERELD-SUPL-V2_0-20071008-D, whole document, 15 pages.

Enabler Release Definition for Mobile Broadcast Services, Draft Version 1.0-01 Apr. 2008; Open Mobile Alliance, OMA-ERELD-BCAST-V1_0-20080401-D, whole document, 19 pages.

UserPlane Location Protocol, Approved Version 1.0-15 Jun. 2007; Open Mobile Alliance, OMA-TS-V1_20070615-A, whole document, 52 pages.

UserPlane Location Protocol, Draft Version 2.0-27 Sep. 2007; Open Mobile Alliance, OMA-TS-ULP_20070927-D, whole document, 322 pages.

UserPlane Location Protocol, Draft Version 2.0-28 Mar. 2008; Open Mobile Alliance, OMA-TS-ULP_20080328-D, whole document, 351 pages.

International Search Report, PCT/EP2008/054505, Form PCT/ISA/210, Dec. 3, 2008, 4 pages; and Written Opinion of the International Searching Authority, Form PCT/ISA/237, Dec. 3, 2008, 6 pages; (10 pages total).

* cited by examiner

PROVIDING POSITIONING ASSISTANCE DATA

CROSS REFERENCE TO RELATED APPLICATIONS

This application is the U.S. National Stage of International Application Number PCT/EP2008/054505 filed on Apr. 14, 2008 which was published in English on Oct. 22, 2009 under International Publication Number WO 2009/127242.

FIELD OF THE INVENTION

The invention relates in general to the field of assisted positioning. More particularly, the invention relates to the provision of positioning assistance data.

BACKGROUND OF THE INVENTION

A position of a device can be determined by means of various positioning methods. Some of these methods may profit from the availability of assistance data.

A positioning of a device is supported for instance by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems.

The constellation in GPS, for example, consists of more than 20 satellites that orbit the earth. Each of the satellites transmits two carrier signals L1 and L2. One of these carrier signals L1 is employed for carrying a navigation message and code signals of a standard positioning service (SPS). The L1 carrier phase is modulated by each satellite with a different C/A (Coarse Acquisition) code. Thus, different channels are obtained for the transmission by the different satellites. The C/A code is a pseudo random noise (PRN) code, which is spreading the spectrum over a 1 MHz bandwidth. It is repeated every 1023 bits, the epoch of the code being 1 ms. The carrier frequency of the L1 signal is further modulated with navigation information at a bit rate of 50 bit/s. The navigation information comprises inter alia ephemeris and almanac parameters. Ephemeris parameters describe short sections of the orbit of the respective satellite. Based on these ephemeris parameters, an algorithm can estimate the position of the satellite for any time while the satellite is in the respective described section. The almanac parameters are similar, but coarser orbit parameters, which are valid for a longer time than the ephemeris parameters. The navigation information further comprises for example clock models that relate the satellite time to the system time of GPS and the system time to the Coordinated Universal Time (UTC).

A GPS receiver of which the position is to be determined receives the signals transmitted by the currently available satellites, and it detects and tracks the channels used by different satellites based on the different comprised C/A codes. Then, the receiver determines the time of transmission of the code transmitted by each satellite, usually based on data in the decoded navigation messages and on counts of epochs and chips of the C/A codes. The time of transmission and the measured time of arrival of a signal at the receiver allow determining the pseudorange between the satellite and the receiver. The term pseudorange denotes the geometric distance between the satellite and the receiver, which distance is biased by unknown satellite and receiver offsets from the GPS system time. Moreover, pseudorange contains various error terms including troposphere and ionosphere delay as well as multipath.

In one possible solution scheme, the offset between the satellite and system clocks is assumed known and the problem reduces to solving a non-linear set of equations of four unknowns (3 receiver position coordinates and the offset between the receiver and GPS system clocks). Therefore, at least 4 measurements are required in order to be able to solve the set of equations. The outcome of the process is the receiver position.

Similarly, it is the general idea of GNSS positioning to receive satellite signals at a receiver which is to be positioned, to measure the pseudorange between the receiver and the respective satellite and further the current position of the receiver, making use in addition of estimated positions of the satellites. Usually, a PRN signal which has been used for modulating a carrier signal is evaluated for positioning, as described above for GPS.

In some environments, a GNSS receiver may be able to acquire and track sufficient satellite signals for a positioning based on the PRN codes, but the quality of the signals may not be sufficiently high for decoding the navigation messages. This may be the case, for instance, in indoor environments. Further, the decoding of navigation messages requires a significant amount of processing power, which may be limited in a mobile GNSS receiver.

Moreover, a satellite signal is distorted on its way from a satellite to a receiver due to, for instance, multipath propagation and due to influences by ionosphere and troposphere. While the GNSS satellites may transmit ionosphere models for correcting the signals accordingly, the provided models may be not very accurate or up-to-date.

If the GNSS receiver is included in a wireless communication terminal or attached as an accessory device to a wireless communication terminal, a wireless access network may therefore be able to provide the wireless communication terminal via a radio link with assistance data. Assistance data is typically provided for each satellite that is visible to the GNSS receiver associated to the cellular terminal. The assistance data may comprise navigation model parameters, which usually include orbit parameters, time of ephemeric (TOE) and time of clock (TOC) parameters and satellite identity parameters. Further, correction data which take account, for example, of GNSS signal delays caused by the atmosphere and the ionosphere, may be provided as assistance data. Such a supported GNSS based positioning is referred to as assisted GNSS (AGNSS). The received information enables the GNSS receiver or the associated wireless communication terminal to obtain a position fix in a shorter time, in more challenging signal conditions or more accurately.

Assistance data for assisted navigation systems, such as GNSSs like GPS, GLONASS and Galileo, have been specified and standardized for various cellular systems. The delivery of such assistance data can be built on top of cellular system-specific control plane protocols including, for example, the radio resource location services protocol (RRLP) for the Global System for Mobile Communications (GSM) networks, the radio resource control (RRC) layer of layer 3 in wideband code division multiple access (WCDMA) networks, and IS-801 for CDMA networks.

The Open Mobile Alliance (OMA) has moreover defined a user plane protocol referred to as secure user plane location (SUPL). SUPL employs user plane data bearers for transferring location assistance information such as GNSS assistance data and for carrying positioning technology-related protocols between terminal, for example a mobile communication device, and its operating network. SUPL is intended to be an alternative and, at the same time, a complement to the existing standards based on signaling in the mobile network control plane. SUPL assumes that a mobile or other network can establish a data bearer connection between a terminal and some type of location server. The use of a user plane protocol becomes especially appealing in case of internet protocol (IP) networks where the data bearer is available by nature.

SUMMARY OF SOME EMBODIMENTS OF THE INVENTION

A method is described which comprises causing a broadcast of positioning assistance data in a plurality of different logical sub-channels. The positioning assistance data has been distributed to the plurality of different logical sub-channels depending on its content.

Moreover, a first apparatus is described, which comprises a processor configured to cause a broadcast of positioning assistance data in a plurality of different logical sub-channels, wherein the positioning assistance data has been distributed to the plurality of different logical sub-channels depending on its content.

The apparatus may comprise for example exclusively the described processor, but it may also comprise additional components. The apparatus could further be for example a module provided for integration into a device, like a processing component, a chip or a circuit implementing the processor, or it could be such a device itself. In the latter case, it could be for instance a server, which comprises in addition an interface configured to provide a link to a wireless communication network, or a network element of a wireless communication network, which comprises in addition an interface configured to provide a link to access stations of the wireless communication network.

Moreover, a second apparatus is described, which comprises means for distributing positioning assistance data depending on its content to a plurality of different logical sub-channels, and means for causing a broadcast of the positioning assistance data in the plurality of different logical sub-channels.

Moreover, a third apparatus is described, which comprises means for receiving location assistance data distributed to a plurality of different logical sub-channels depending on its content, and means for causing a broadcast of the positioning assistance data in the plurality of different logical sub-channels.

The means of these apparatuses can be implemented in hardware and/or software. They may comprise for instance a processor for executing computer program code for realizing the required functions, a memory storing the program code, or both. Alternatively, they could comprise for instance a circuit that is designed to realize the required functions, for instance implemented in a chipset or a chip, like an integrated circuit. It is to be understood that further means may be comprised which realize any of the functions that may optionally be implemented in any described embodiment of the first apparatus.

Moreover, a non-transitory computer readable storage medium is described, in which computer program code is stored. The computer program code realizes the described method when executed by a processor. The computer readable storage medium could be for example a disk or a memory or the like. The computer program code could be stored in the computer readable storage medium in the form of instruction encoding the computer-readable storage medium. It is to be understood that also the computer program code by itself has to be considered an embodiment of the invention.

Thus, certain embodiments of the invention ensure that positioning assistance data is provided by broadcast, and in addition that it is broadcast in separate sub-channels. It is to be understood that the positioning assistance data may be assistance data for a GNSS based positioning, but equally assistance data for any other kind of positioning method.

In one embodiment of the described method, the method comprises in addition distributing the positioning assistance data depending on its content to the plurality of different logical sub-channels. In an embodiment of the first described apparatus, the processor may further be configured to realize this function. A corresponding function can equally be realized by an embodiment of the described computer program code when executed by a processor. Thus, the apparatus or the computer program code may initiate the broadcast of assistance data in sub-channels.

In one embodiment of the described method, the method comprises as well encrypting at least a part of the positioning assistance data that is to be distributed to the plurality of different logical sub-channels. In an embodiment of the first described apparatus, the processor may further be configured to realize this function. A corresponding function can equally be realized by an embodiment of the described computer program code when executed by a processor.

It would be possible, for example, to encrypt different kind of content of the broadcast using different keys, and thus to deliver differentiated assistance data—like different levels of assistance service—to different subscribers. A distribution of keys to the terminals could be related to, for instance, charging or geographical areas. Hence, service providers might obtain the possibility of building "assistance service packages" that might differ in performance characteristics or other characteristics. The subscribers can then, for instance, buy different levels of assistance service based on their needs. All the assistance data may still be available in the same broadcast, that is the broadcast does not have to be customized. Still, the data which the terminal actually retrieves from the broadcast may be highly customized, since it is the terminal that picks the relevant items from the broadcast. Such an embodiment may reduce hardware and software requirements, complexity and costs of a service provider providing the assistance data.

In one embodiment of the described method, the method comprises receiving the location assistance data distributed to the plurality of different logical sub-channels. In an embodiment of the first described apparatus, the processor may further be configured to realize this function. A corresponding function can equally be realized by an embodiment of the described computer program code when executed by a processor. Thus, the apparatus or the computer program code does not necessarily initiate the broadcast of assistance data in sub-channels itself, but it may also be responsible for receiving and forwarding the assistance data in sub-channels.

In one embodiment of the described method, the method comprises as well determining access points which enable an access to a location assistance service and which are currently accessed by a terminal subscribing to a location assistance service. The embodiment may further comprise causing a broadcast of the positioning assistance data in a plurality of logical sub-channels via such determined access points only. In an embodiment of the first described apparatus, the processor may further be configured to realize this function. A corresponding function can equally be realized by an embodiment of the described computer program code when executed by a processor.

Such embodiments, which rely on broadcasts in the control plane, allow preventing the transmission of information unnecessarily in cells that do not have any users for the information. For example, in contrast to traditional broadcast, obtaining access to an IP broadcast may require registration to a particular service so that a corresponding determination of terminals may be supported.

It is to be understood that it would also be possible to decide on the areas in which the assistance data is broadcast on other criteria. Whereas, for instance, certain satellite navigation models, like almanac, could be distributed on a global basis, certain advanced ionosphere models which apply to restricted geographical areas, like Europe, could be distributed on such basis.

In one embodiment of the invention, a respective logical sub-channel is provided for assistance data for each of a plurality of service quality levels. Different service quality levels may include for example a different number of parameters, different accuracies or different resolutions, etc.

In one embodiment of the invention, a respective logical sub-channel is provided for assistance data for each of a plurality of beacon systems, like different GNSSs. For example, a first sub-channel may be provided for GPS assistance data and a second sub-channel for Galileo assistance data, etc.

In one embodiment of the invention, a respective logical sub-channel is provided for assistance data for each of a plurality of positioning methods. One positioning method could be for example a GNSS based positioning, another method could be an access station identity based positioning, which assumes a rough position of a terminal to correspond to the position of a fixed access station of which the terminal currently able to hear signals, etc.

In one embodiment of the invention, a respective logical sub-channel is provided for assistance data for each of a plurality of update rates. That is, the same information could be provided in different sub-channels at different update rates.

In one embodiment of the invention, a respective logical sub-channel is provided for assistance data for each of a plurality of types of assistance data. One type of assistance data could be for example navigation models, while another type of assistance data could be ionosphere models, etc.

In one embodiment of the invention, a respective logical sub-channel is provided for assistance data for each of a plurality of fragments of a database for positioning services. If desired, the entire database could be provided in a further sub-channel.

In one embodiment of the invention, a respective logical sub-channel is provided for assistance data for each of a plurality of geographic areas. For example, certain data that is of relevance for the area of a respective country or continent could be summarized in one sub-channel. Such data could comprise for example regional ionosphere models or regional access station identity maps.

In one embodiment of the invention, a logical sub-channel is provided for varying assistance content based on triggers. An example for such a trigger is atmospheric events.

To present one example, during ionospheric storm it may be of advantage to update a ionospheric model, which is provided as assistance data, at a very high rate in order to ensure that the provided assistance data has the highest possible accuracy. Such high-update rate assistance may be delivered efficiently in a broadcast, since point-to-point deliveries would increase the network load significantly. Since the high-update rate may not be required constantly, the assistance data may further be provided at this high-update rate for instance in a sub-channel that is provided for varying assistance content. That is, this sub-channel may be used for delivering other content in the case of other triggers. In general, the broadcasting using sub-channels may enable dynamic scheduling of the broadcast content depending on various factors.

In one embodiment of the invention, the assistance data comprises data mapping identifiers of access stations providing access to a location assistance service to a respective location. For example, cell-IDs that are associated to the base stations serving the cells of a cellular network may be mapped to the locations of the base stations, or wireless local area networks access points (WLAN AP) may be mapped to the locations of the access points.

In one embodiment of the invention, one logical sub-channel is provided for assistance data which supports a first fix of a position of an entity receiving the assistance data.

The sub-channels can be realized in different ways.

In one embodiment of the invention, the plurality of logical sub-channels comprise a plurality of data files and/or a plurality of streams.

In one embodiment of the invention, the plurality of logical sub-channels are realized by using a plurality of transport layer protocol ports. In the case of IP-protocols, sub-channels may be realized, for instance, as transmission control protocol/user datagram protocol (TCP/UDP) ports, where each port is associated to another stream to which the assistance data has been distributed.

In one embodiment of the invention, the broadcast using a plurality of logical sub-channels is a broadcast in a user plane, using for example user plane data bearers. Compared to a broadcast in a control plane or management plane, for example, a broadcast in a user plane may have less bandwidth restrictions. Certain assistance data may require a high bandwidth, for instance three-dimensional ionosphere maps providing highly accurate corrections to GNSS measurements, or assistance data that is provided at high update rates. Further, terminals are not required to be in an idle state to receive user plane broadcasts. Further, broadcasts in the user plane may not suffer from a low priority due to some high priority messages, like system information and control messages that are transmitted in other planes.

In one embodiment of the invention, the broadcast using a plurality of logical sub-channels is an internet protocol broadcast.

In one embodiment, a method is an information providing method, comprising the step of causing a broadcast of positioning assistance data in a plurality of different logical sub-channels, wherein the positioning assistance data has been distributed to the plurality of different logical sub-channels depending on its content.

In a further embodiment, an apparatus is an information providing apparatus comprising processing means for causing a broadcast of positioning assistance data in a plurality of different logical sub-channels, wherein the positioning assistance data has been distributed to the plurality of different logical sub-channels depending on its content.

In one embodiment of the invention, one of the described apparatuses can be seen as assistance broadcast service apparatuses.

The invention can further be used for providing any kind of positioning assistance data, in particular, though not exclusively, assistance data for a satellite signal based positioning. Such satellite signals may comprise satellite signals transmitted in a GNSS, like GPS, GLONASS, GALILEO, SEAS, QZSS, LAAS or a combination of these. LAAS makes use of pseudolites instead of true satellites, but these pseudolites are to be understood to be covered as well by the term satellite as used in this application. LAAS has the advantage that it enables a positioning under indoor conditions as well.

For supporting a GNSS based positioning, for example, assistance data may comprise, but is not limited, navigation models, time assistance, reference location, atmosphere models, differential corrections, sensor assistance and acquisition assistance, position information, high-accuracy position, information, multi-frequency multi-GNSS measurement data, sensor measurements, route information and waypoint information.

It is to be understood that assistance data may also be provided for other positioning methods than GNSS based positioning method, like stand-alone methods that are based on the location of access stations.

Further, it is to be understood that the broadcast is not limited to a broadcast via cellular communication networks. Other examples include WLAN.

Embodiments of the invention could be implemented for instance in the scope of an Open Mobile Alliance Mobile Broadcast Services Enabler Suite (OMA BCAST) service.

It is to be understood that any feature presented for a particular exemplary embodiment may also be used in combination with any other described exemplary embodiment.

Further, it is to be understood that the presentation of the invention in this section is merely exemplary and non-limiting.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE INVENTION

Figure 1:
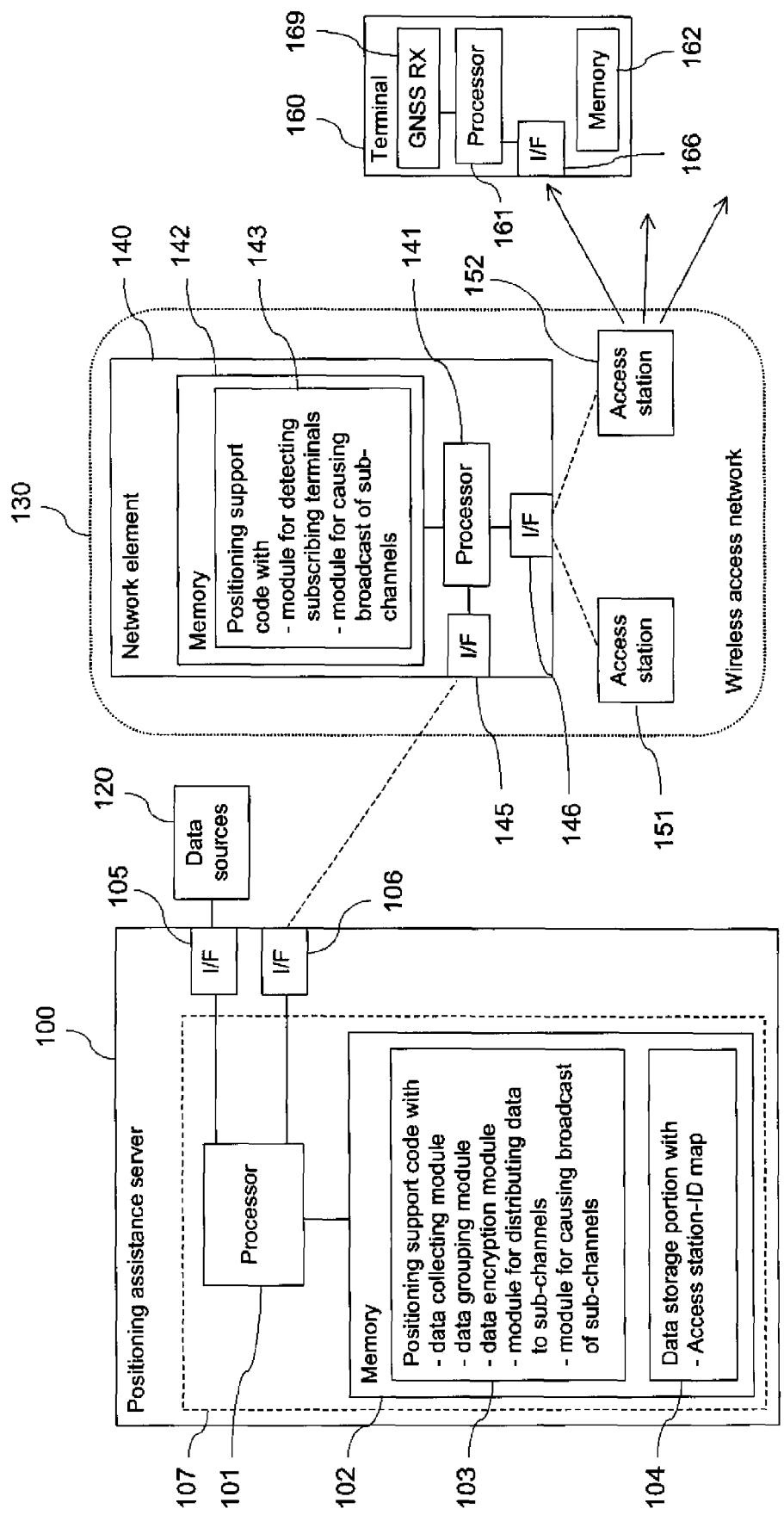
FIG. 1 is a schematic diagram of an exemplary system in which an embodiment of the invention is implemented.

FIG. 1 is a schematic block diagram of an exemplary system which supports a broadcast of positioning assistance data in sub-channels.

The system comprises a positioning assistance server 100, data sources 120, a wireless access network 130 and a terminal 160.

The positioning assistance server 100 comprises a processor 101 and, linked to this processor 101, a memory 102, an interface 105 to the data sources 120 and an interface 106 to at least one network 130. The processor 101 and the memory 102 could optionally be integrated in a single component 107 illustrated in FIG. 1 by dashed lines, for example on a chip.

The processor 101 is configured to execute implemented computer program code. The memory 102 stores computer program code, which may be retrieved by the processor 101 for execution. The stored computer program codes comprise a positioning support code 103, including a functional module for collecting assistance data, a functional module for grouping the collected assistance data, a functional module for encrypting assistance data, a functional module for distributing assistance data to sub-channels and a functional module for causing a broadcast of the assistance data in sub-channels. The memory 103 can thus be seen as an embodiment of a computer readable storage medium according to the invention.

The memory 102 comprises in addition a data storage portion 104. The data storage portion stores a database mapping the identifier (ID) of each access station 151, 152 providing access to a network 130 to a respective location of the access station. The access stations can be access stations of a single network or of a plurality of networks. The identifiers can be for example cell IDs of a cellular communication network or WLAN APs.

It is to be understood that it would also be possible to use a single interface to data sources and networks or to use a plurality of interfaces to different data sources and/or different networks. The interfaces 106 may provide a direct link to any data source or network or an indirect link, for example via the internet.

The data sources 120 may include any server that is able to provide content for assisting terminals in a positioning. They may include for instance servers providing GNSS data, like orbit models and clock models, and servers providing regional or continent-wide ionosphere models, etc. They may also include for example satellites of a Satellite Based Augmentation System (SBAS) providing correction data for GNSS signals, like the Wide Area Augmentation System (WAAS) or the European Geostationary Navigation Overlay Service (EGNOS), etc.

The wireless access network 130 can be for example a cellular communication network or a WLAN, etc.

The wireless access network 130 comprises various network elements. Some network elements 140 may be provided for controlling the data traffic via one or more access stations 151, 152 that enable a wireless access to the network 130. Network element 140 could be for example a serving general packet radio service (GPRS) support node (SGSN) of a cellular communication network while access stations 151, 152 could be base stations or Node Bs of the cellular communication network. Alternatively, the network element 140 could be for example a WLAN server and the access stations 151, 152 could be WLAN access points.

The network element 140 comprises a processor 141 and, linked to this processor 141, a memory 142, an interface 145 to the positioning assistance server 100 and an interface 146 to a plurality of access stations 151, 152. The processor 141 and the memory 142 could optionally be integrated in a single component, for example on a chip.

The processor 141 is configured to execute implemented computer program code. The memory 142 stores computer program codes, which may be retrieved by the processor 141 for execution. The stored computer program codes comprise a positioning support code 143, including a functional module for detecting subscribing terminals accessing the linked access stations 151, 152 and a functional module for causing a broadcast of the assistance data in sub-channels. The memory 143 can thus be seen as another embodiment of a computer readable storage medium according to the invention.

The access stations 151, 152 enable wireless terminals to access the wireless access network 130 and via this network 130 a location assistance service provided by positioning assistance server 100.

The depicted wireless communication terminal 160 can be for instance a mobile phone or a laptop, but equally any other device of which a position might have to be determined. The terminal 160 comprises a processor 161 and, linked to this processor 161, a memory 162, an interface 166 and a user interface (not shown). The processor 161 is further linked to a GNSS receiver 169.

The processor 161 is configured to execute implemented computer program code. The memory 162 stores computer program code, which may be retrieved by the processor 161 for execution. The stored program codes comprise a positioning code, which includes a functional module for an assisted, satellite based positioning.

The interface 166 enables a communication via a wireless link with the wireless access network 130. The interface 166 could be for example a transceiver belonging to a cellular engine of the terminal 160 and support an access to a cellular communication network, or it could belong to a WLAN engine of the terminal 160 and support an access to a WLAN.

The user interface may provide input and/or output functionality. It could comprise for example keys, a touchpad, a display, loudspeakers, etc.

The GNSS receiver 169 may be integrated in the terminal 160. Alternatively, though, it could also be or belong to an accessory device that is connected to the terminal 160. A GNSS accessory device could be connected to the terminal 160 via any suitable link, like a physical connection or a Bluetooth™ link, etc. The GNSS receiver 169 could be configured to receive, acquire, track and decode signals transmitted by satellites belonging to one or more GNSSs, like GPS and Galileo and to provide the resulting data to the processor 161.

Figure 2:
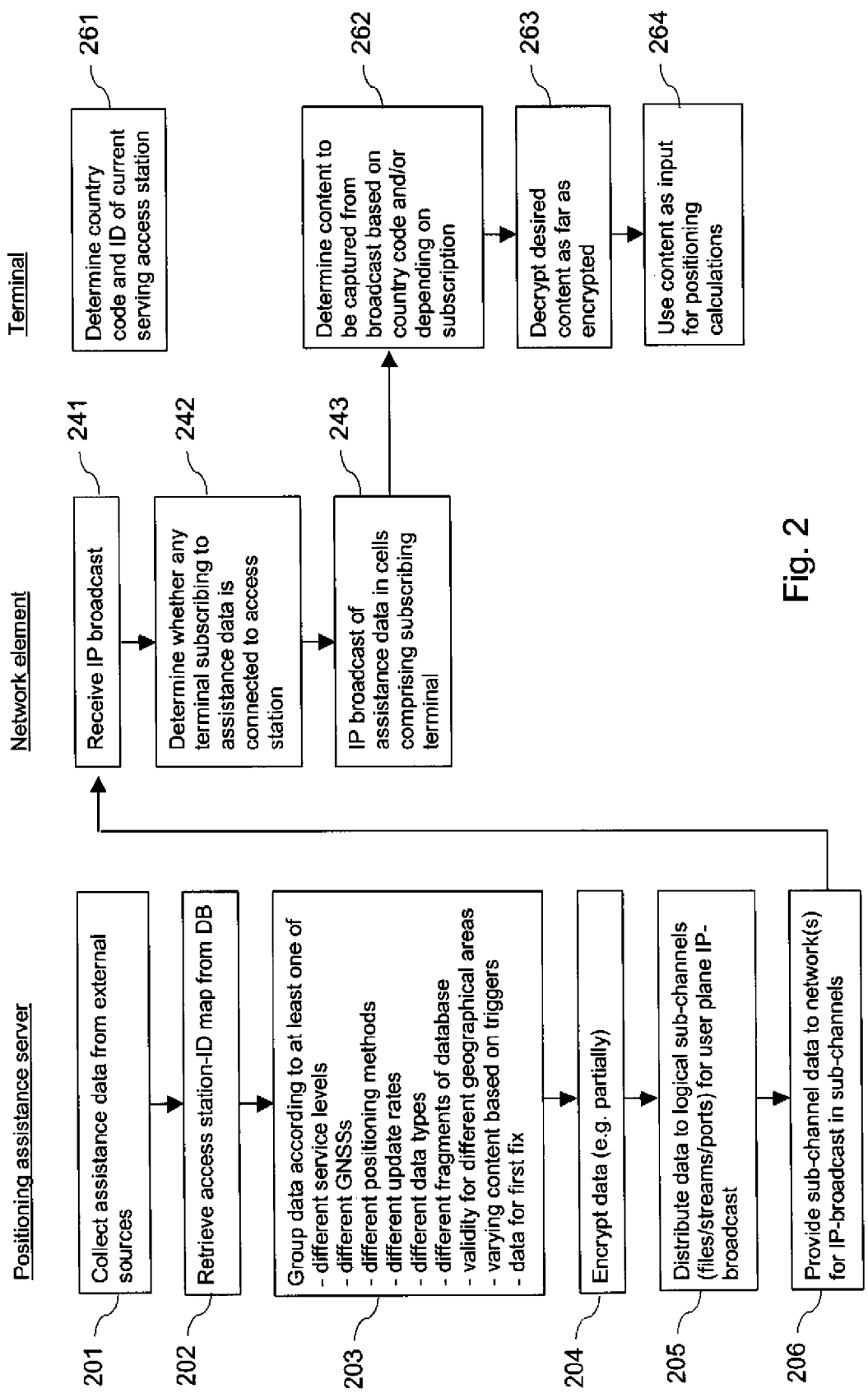
FIG. 2 is a flow chart illustrating an exemplary operation in the system of FIG. 1.

An exemplary operation in the system of FIG. 1 is illustrated in the flow chart of FIG. 2.

FIG. 2 presents on the left hand side an operation at the positioning assistance server 100, in the middle an operation at network element 140 and on the right hand side an operation at terminal 160.

In the positioning assistance server 100, the processor 101 uses the data collecting module of positioning support code 103 for collecting assistance data from external data sources 120 via interface 105 (step 201). The data from external sources may comprise for example GNSS data for several GNSS, as well as ionosphere model data. The processor 101 further uses the data collecting module of positioning support code 103 for retrieving assistance data from data storage portion 104 of the memory 102 (step 202). The data from data storage portion 104 may comprise an access station ID map and fragments of the access station ID map. Each fragment may comprise for example the information on cell IDs of a respective country.

The processor 101 uses the data grouping module of positioning support code 103 for grouping the collected data (step 203). The grouping can be based on various criteria.

Different groups can be provided for different service quality levels. For example, data having a high accuracy or resolution could be in one group and data having a lower accuracy or resolution could be in another group. It is to be understood that groups for intermediate service quality levels could be provided as well.

Similarly, different groups can be provided for assistance data that is provided at different update rates.

In addition or alternatively, different groups can be provided for assistance data for different positioning systems, like GPS, Galileo or GLONASS, etc.

In addition or alternatively, different groups can be provided for assistance data that is required for different positioning methods.

In addition or alternatively, different groups can be provided for different types of assistance data, such as navigation models on the one hand and ionosphere models on the other hand.

In addition or alternatively, different groups can be provided for different fragments of a database for location services, for example different fragments of a Cell-ID map. It is to be understood that alternatively or in addition, a separate group could be provided for the full database, if desired.

In addition or alternatively, different groups can be provided for assistance data for different geographical areas.

In addition or alternatively, a group can be provided for varying assistance content based on triggers such as atmospheric events.

In addition or alternatively, a group can be provided which comprises all assistance data required for a first fix, for example orbit and clock models as well as a coarse global or regional ionospheric model. In the simplest configuration, such a group could contain a subset of the same data as transmitted in a GNSS satellite broadcast.

The processor 101 uses the data encryption module of positioning support code 103 for encrypting the data in all or some of the provided groups (step 204). For example, data that is to be provided free of charge might not be encrypted, while assistance data enabling a higher accuracy of positioning may be encrypted.

The processor 101 uses the distribution module of positioning support code 103 for distributing the grouped data to different logical sub-channels of an IP broadcast (step 205). For example, each group could be distributed to another logical sub-channel. Alternatively, different groups could be combined in a single sub-channel. Each logical sub-channel may be implemented as a separate file or as a separate stream.

The processor 101 uses the broadcast module of positioning support code 103 for causing a broadcast of the sub-channels in a user plane IP broadcast via one or more networks 130 (step 206). The data is provided to the networks 130 via interface 106. The sub-channels may be realized, for instance, by transmissions via different TCP/UDP ports.

The network 130 receives the data and broadcasts it in an IP broadcast to all network elements 140 controlling at least one access station 151, 152.

In the network element 140, the processor 141 receives the broadcast via interface 145 (step 241) and uses the subscribing terminal detecting module of positioning support code 143 for determining whether any terminal subscribing to a location assistance service is connected to one of access stations 151, 152 (step 242).

Using the broadcasting module of positioning support code 143, the processor 141 causes a transmission of the received data in sub-channels of a user plane IP broadcast via all access stations 152 to which at least one subscribing terminal 160 is currently connected (step 243).

The processor 161 of the subscribing terminal 160 can determine the country code and an identifier (ID) of the current serving access station 152 (step 261). All current cellular standards include for example some kind of information broadcast capability. Typically, the broadcast provides some information about the network to the terminal, such as base station and network identification, frequencies in use, information about neighboring cells, allowed power levels etc. Usually, it is referred to as system information, and broadcast in system information messages. The same information is provided to all users in the coverage area of a cell. For example, in GSM this information is transmitted using System Information messages in Broadcast Control Channel (BCCH). The terminal 160 may thus obtain the country code and an identifier of the serving access station 152 for example based on such broadcast information.

The processor 161 may determine based on the country code and/or on a subscription which content should be captured from a broadcast by access station 152 (step 262).

The processor 161 may then decrypt the captured content—as far as encrypted and as far as keys for decrypting are available due to a subscription (step 263).

Finally, the processor 161 may use the content as input for positioning calculations (step 264). For example, the location of the access station 152, which can be determined from a received Cell-ID map, can be used as a rough position of the terminal 160 for speeding up the acquisition of signals at the GNSS receiver 169. Or a received ionosphere model may be used for correcting ionospheric errors in the measurements of GNSS receiver 169 for refining the position calculations.

Figure 3:
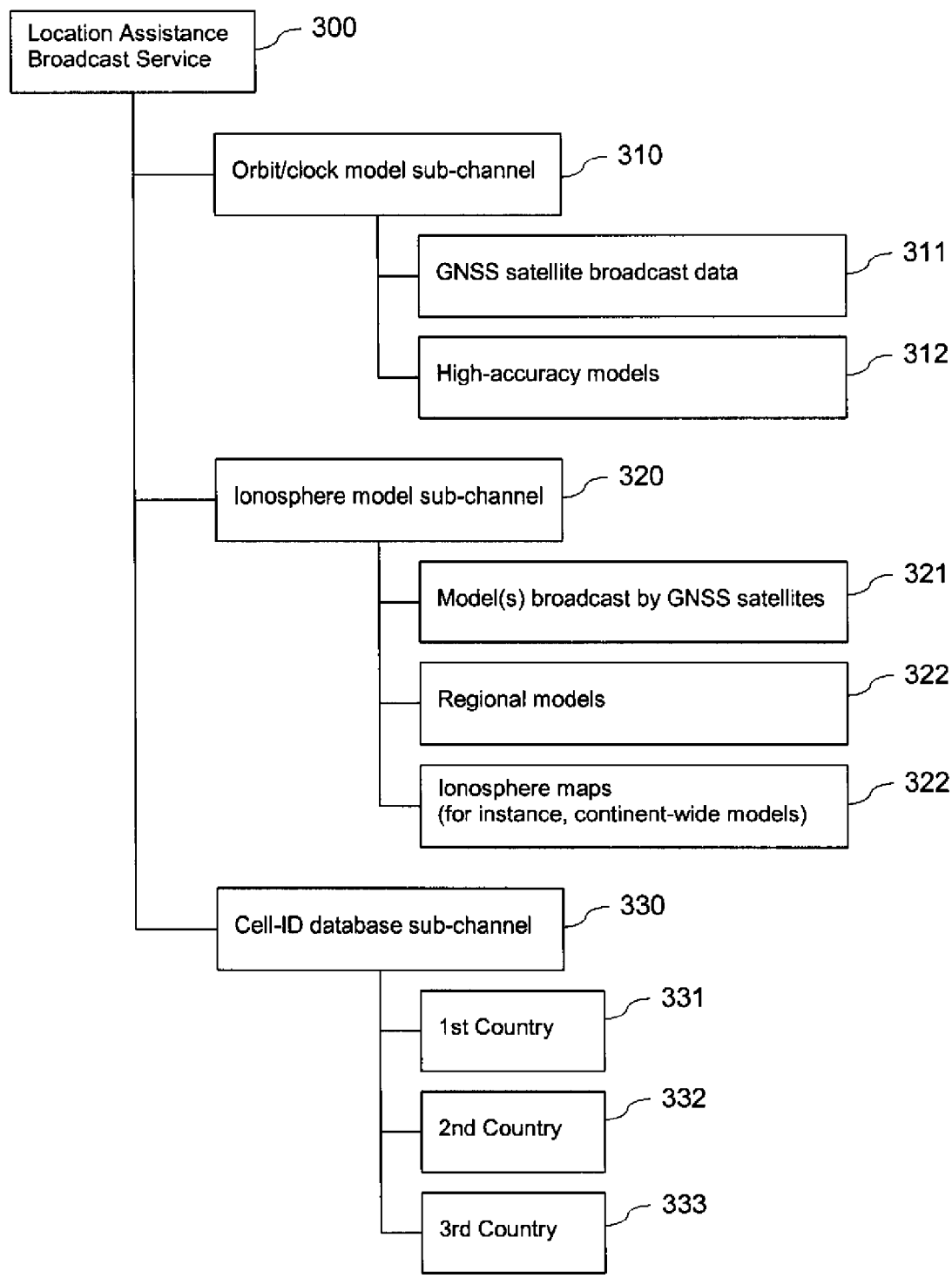
FIG. 3 is a diagram illustrating a first exemplary division of assistance data into sub-channels of a broadcast.

One exemplary embodiment of the distribution of assistance data to different broadcast sub-channels is presented in FIG. 3.

A terminal may subscribe to a location assistance broadcast service 300.

For this service, data is transmitted in an IP broadcast. Different types of content are transmitted in different sub-channels of the broadcast. A first sub-channel 310 provides orbit and clock model for one or more GNSS. A second sub-channel 320 provides data for a ionosphere model. A third sub-channel 330 provides data of a Cell-ID database.

Each of the sub-channels 310, 320, 330 comprises in addition different groups of content.

The orbit and clock model sub-channel 310 comprises GNSS satellite broadcast data 311, that can be used free of charge. In addition, it comprises high-accuracy models 312 for orbit and clock. This data is provided as an added value service providing for example more accuracy than the free of charge data. It can be encrypted to ensure that only subscribers having a corresponding key for decryption may access this data.

The ionosphere model sub-channel 320 comprises data for a model or several models broadcast by GNSS satellites 321. The content of this group 321 is again free of charge. In addition, the ionosphere model sub-channel 320 comprises data for regional models 322. Each model could be valid, for example, for one continent. The data provides an added value service by providing for example a higher accuracy than the free of charge data. It can be encrypted to ensure that only subscribers having a corresponding key for decryption may access this data. In addition, the ionosphere model sub-channel 320 comprises data for complete ionosphere maps, for instance for continent-wide ionosphere models 323. The data provides another added value service providing still better performance than regional models. It can be encrypted to ensure that only subscribers having a corresponding key for decryption may access this data.

The cell-ID database sub-channel 330 may be provided for delivering cell-ID or WLAN AP database information to the subscribers, including for example a database mapping cell IDs of GSM cells, Universal Mobile Telecommunications System (UMTS) cells, CDMA cells, WiMax cells and/or $3^{rd}$ generation partnership project (3GPP) long-term evolution (LTE) cells to geographical coordinates for positioning or reference location purposes.

The cell-ID database sub-channel 330 comprises map data for a first country 331, map data for a second country 332 and map data for a third country 333. This information may equally be free of charge and enable a terminal to deduce which content to capture based, for instance, on the country code of a serving cell. For example, data for a regional ionosphere model for a specific country may be selected based on this information. The cell-ID database could also be fragmented for example on an operator basis.

The terminal 160 might recognize the country for which assistance data is desired based on the country code or the network of the current serving cell. This way the terminal could obtain a local copy of the appropriate fragment of the cell-id database broadcast in sub-channel 330. Having a local copy of the database may improve the time-to-first-fix and may also allow a (coarse) positioning even if the AGNSS does not work. Also, in contrast to assistance data broadcast services that are tightly coupled with the network topology, this implementation enables for example receiving a cell-ID database of cells in France while the user is in Finland. This way a user could prepare for a holiday trip by using probably lower data fee of the home network.

The different categories in the sub-channels may also be linked to charging functions, if available, in the broadcast service.

Figure 4:
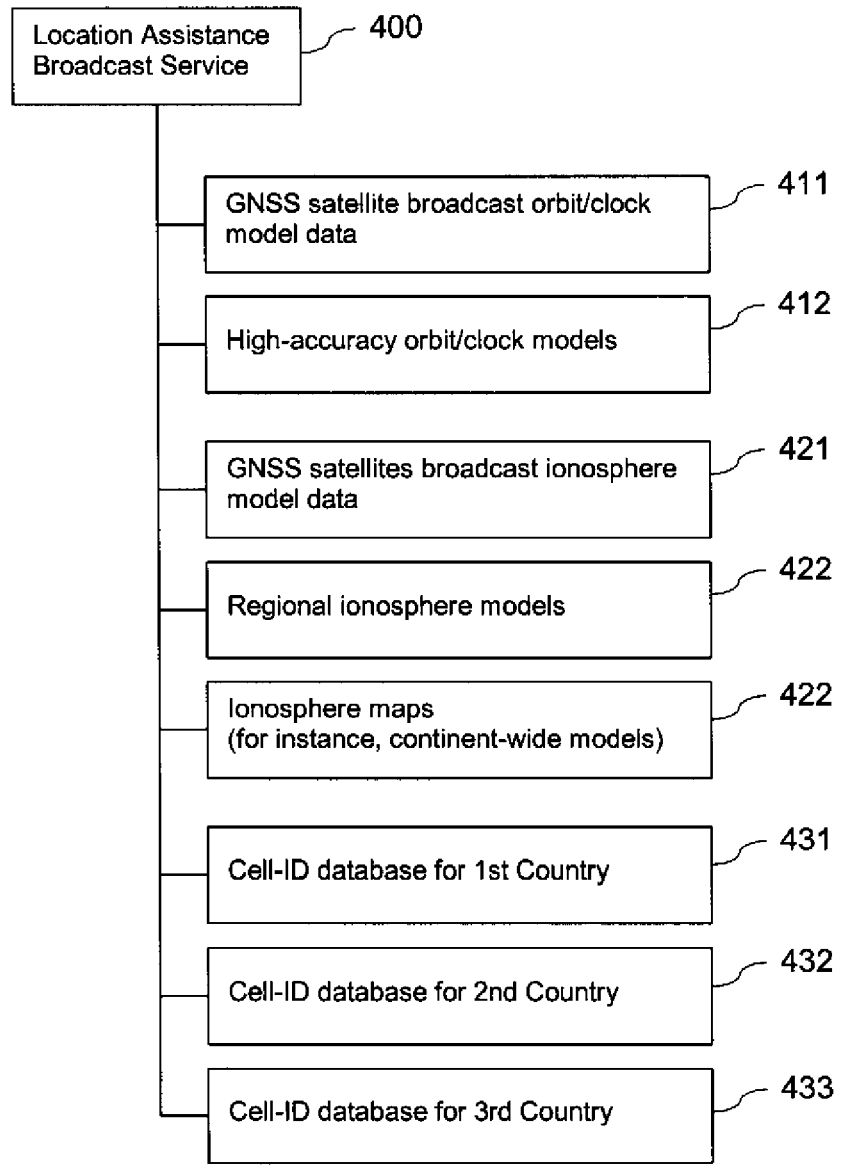
FIG. 4 is a diagram illustrating a second exemplary division of assistance data into sub-channels of a broadcast.

Another exemplary embodiment of the distribution of data to different sub-channels is presented in FIG. 4. In this embodiment, each group has its own sub-channel.

For this embodiment, a terminal may subscribe again to a location assistance broadcast service 400. For this service, data is transmitted in an IP broadcast.

Different types of content are transmitted in different sub-channels of the broadcast.

A first sub-channel 411 provides orbit and clock model data as broadcast by GNSS satellites of one or more GNSS.

A second sub-channel 412 provides high-accuracy orbit and clock models.

A third sub-channel 421 provides data for a ionosphere model as broadcast by GNSS satellites of one or more GNSS.

A fourth sub-channel 422 provides data for regional ionosphere models.

A fifth sub-channel 423 provides data for ionosphere maps, for example, for continent-wide models.

It is to be understood that a separate sub-channels could be used for each involved GNSS. Further, separate sub-channels could be used for each covered region.

A sixth sub-channel 431 provides data of a Cell-ID database for a first country.

A seventh sub-channel 432 provides data of a Cell-ID database for a second country.

A sixth sub-channel 433 provides data of a Cell-ID database for a third country.

The content of sub-channels 411, 421, 431, 432 and 433 could be again free of charge, while the content of sub-channels 412, 422 and 423 may not be free of charge.

It is to be understood that the example presented with reference to FIGS. 3 and 4 could be varied or supplemented in may ways, some options being indicated above with reference to step 203. The choice of implementation may be based, for instance, on how charging functions are implemented in the service.

It has further to be noted that the data does not have to be provided by a single service. Alternatively, the full assistance delivery concept might be divided into various services based for example on performance they provide. For example, a first service could provide the basic assistance, like the data in GNSS broadcasts, while another one could provide more accurate models and a third one the highest quality assistance.

In one embodiment it might be desired to ensure that the information that might be of advantage at a terminal for starting positioning, such as basis orbit/clock models, basic ionospheric models, is available at high-rate in the broadcast so that the scheduling of the broadcast does not adversely affect time-to-first-fix. It might therefore be provided to have a sub-channel that is specialized on getting the first fix. Such a channel could incorporate certain basic information including orbit and clock models as well coarse global/regional ionospheric model. In the simplest configuration this dedicated sub-channel might broadcast a subset of the same data as is provided in GNSS satellite broadcasts.

The majority of positioning assistance data that is to be delivered to terminals may be common or almost common to all the terminals, either globally or to all users in a large geographical area. An example of this is the ionosphere model in the GPS broadcast that is truly global. Using a broadcast for providing such information allows sending the latest updates to subscribers without introducing unnecessary overhead in the communication, as in the case of terminals individually requesting assistance data from a server. Possible advantages include a lower network load and thus lower costs for delivering assistance data to the terminals. Moreover, individual assistance data requests also potentially result in delays in assistance data delivery due to the need to set up an individual session. Since this can be avoided when using a broadcast, the user experience may be better. Broadcast can be considered as a kind of assistance data push utilizing broadcast mechanism.

Transmitting the assistance data moreover in broadcast sub-channels may render the use of assistance data moreover more flexible in some embodiments.

For example, while the broadcast data could be the same for all the subscribers, a terminal might accept only those parts that are relevant for the terminal's geographical area.

Moreover, the use of sub-channels may enable as well new business models with respect to providing different service levels for different subscribers, for example by differentiating between different accuracies of the assistance data or different assistance data types. A terminal may only be able to use data that corresponds to its subscription to a location assistance service.

A differentiation between different assistance data content in different sub-channels may also be of advantage to a user. On the one hand, the user may only have to pay for data that is actually desired. A user employing a terminal supporting only GPS might not have to be charged for a common delivery of GPS and Galileo assistance data. A user who is satisfied with low resolution assistance data might not be charged for high resolution assistance data. On the other hand, delays may be reduced if a user who is only interested in one type of data is able to retrieve this data from a sub-channel. In the case of an undivided broadcast in which all data is provided in a cyclic sequence, the user would always have to wait until the data of interest is transmitted again.

The use of different sub-channels may also facilitate the support of different positioning methods, including cell-id- or WLAN-based methods, by delivering/updating fragments of the databases to subscribing terminals. Cell-id or WLAN AP databases, etc., may provide reference location for AGNSS, but they can also be used for standalone positioning. For instance, WLAN-based positioning can provide instant positioning given that the terminal has a local copy of the WLAN AP database. Broadcasting this data may be a useful method to deliver database or its updates to a large number of terminals.

The use of different sub-channels may also facilitate a dynamic adjustment of the broadcast schedule depending on different conditions. For instance, in the case of ionosphere storm, the ionosphere models may be broadcast at high update rate. When transmitting different types of assistance data in different sub-channels, this does not necessarily have to decrease the rate at which other data, like the orbit/clock models repeat in the broadcast, as would be the case if all the data is transmitted in the same sub-channel.

It is to be understood that the utilization of broadcast does not exclude the possibility that the terminal could initiate the position session using an individual connection, for example based on OMA SUPL, but then keep certain data, like ionosphere maps, up-to-date based on the broadcast. Alternatively, the terminal may be attached to the broadcast continuously and that way the terminal could always have the latest assistance data.

Finally, it may be noted that different possible embodiments of the invention may contribute to a shorter time-to-first fix of a terminal that is to be positioned.

Any presented link or connection in this document is to be understood in a way that the involved components are operationally coupled. Thus, the connections can be direct or indirect with any number or combination of intervening elements, and there may be merely a functional relationship between the components. Also the link between server 100 and network element 140 as well as between network element 140 and access stations 151, 152 may involve any number of intervening elements.

Further, any of the mentioned processors could be of any suitable type, for example a computer processor, field-programmable gate arrays, an application-specific integrated circuit (ASIC), etc. Any of the mentioned memories could be implemented as a single memory or as a combination of a plurality of distinct memories, and may comprise for example a read-only memory, a flash memory or a hard disc drive memory, etc. Furthermore, any other hardware components that have been programmed in such a way to carry out the described functions could be employed as well.

Moreover, any of the steps described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as field-programmable gate arrays, application-specific integrated circuits (ASICs), signal processing devices, and other devices.

The functions illustrated by the processor 101 executing program code 103 can also be viewed as means for distributing positioning assistance data depending on its content to a plurality of different logical sub-channels, and as means for causing a broadcast of positioning assistance data in a plurality of different logical sub-channels.

The program codes 103 can also be viewed as comprising such means in the form of functional modules.

The functions illustrated by the processor 141 executing program code 143 can also be viewed as means for receiving location assistance data distributed to a plurality of different logical sub-channels depending on its content, and as means for causing a broadcast of the positioning assistance data in the plurality of different logical sub-channels.

The program codes 143 can also be viewed as comprising such means in the form of functional modules.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures.

What is claimed is:

1. A method comprising:
 causing, by a configured processor, a broadcast of positioning assistance data in a plurality of different logical sub-channels, wherein the positioning assistance data has been distributed to the plurality of different logical sub-channels depending on its content such that a respective different logical sub-channel is provided for at least one of:
 orbit and clock models as broadcast by satellites of at least one global navigation satellite system and high-accuracy orbit and clock models;
 each of a plurality of regional ionosphere models and one of an ionosphere model as broadcast by satellites of at least one global navigation satellite system and ionosphere maps for continent-wide models;
 a cell identifier database for a first country and a cell identifier database for a second country; and
 each of a plurality of service quality levels of the assistance data, wherein different service quality levels include at least one of different accuracies and different resolutions of the assistance data.

2. The method according to claim 1 further comprising one of:
 distributing the positioning assistance data depending on its content to the plurality of different logical sub-channels; and
 receiving the position assistance data distributed to the plurality of different logical sub-channels.

3. The method according to claim 2, further comprising:
 encrypting at least a part of the positioning assistance data that is to be distributed to the plurality of different logical sub-channels.

4. The method according to claim 1, further comprising:
 determining access points which enable an access to a location assistance service and which are currently accessed by a terminal subscribing to a location assistance service; and
 causing a broadcast of the positioning assistance data in a plurality of logical sub-channels via such determined access points only.

5. The method according to claim 1, wherein a respective logical sub-channel is provided for assistance data for at least one of:
 each of a plurality of beacon systems;
 each of a plurality of positioning methods;
 each of a plurality of update rates;
 each of a plurality of types of assistance data; and
 each of a plurality of geographic areas.

6. The method according to claim 1, wherein the assistance data comprises data mapping identifiers of access stations providing access to a location assistance service to a respective location.

7. The method according to claim 1, wherein the plurality of logical sub-channels comprise at least one of a plurality of data files and a plurality of streams.

8. The method according to claim 1, wherein the plurality of logical sub-channels are realized by using a plurality of transport layer protocol ports.

9. The method according to claim 1, wherein the broadcast using the plurality of logical sub-channels is an internet protocol broadcast.

10. An apparatus comprising:
 at least one processor; and
 at least one memory including computer program code,
 the computer program code, when executed by the at least one processor, causing the apparatus at least to:
 cause a broadcast of positioning assistance data in a plurality of different logical sub-channels, wherein the positioning assistance data has been distributed to the plurality of different logical sub-channels depending on its content such that a respective different logical sub-channel is provided for at least one of:
 orbit and clock models as broadcast by satellites of at least one global navigation satellite system and high-accuracy orbit and clock models;
 each of a plurality of regional ionosphere models and one of an ionosphere model as broadcast by satellites of at least one global navigation satellite system and ionosphere maps for continent-wide models;
 a cell identifier database for a first country and a cell identifier database for a second country; and
 each of a plurality of service quality levels of the assistance data, wherein different service quality levels include at least one of different accuracies and different resolutions of the assistance data.

11. The apparatus according to claim 10, wherein the computer program code, when executed by the at least one processor, causing the apparatus at least to perform one of:
 distribute the positioning assistance data depending on its content to the plurality of different logical sub-channels; and
 receive the position assistance data distributed to the plurality of different logical sub-channels.

12. The apparatus according to claim 11, wherein the computer program code, when executed by the at least one processor, causing the apparatus at least to encrypt at least a part of the positioning assistance data that is to be distributed to the plurality of different logical sub-channels.

13. The apparatus according to claim 10,
 wherein the computer program code, when executed by the at least one processor, causing the apparatus at least to determine access points which enable an access to a location assistance service and which are currently accessed by a terminal subscribing to a location assistance service; and
 wherein the computer program code, when executed by the at least one processor, causing the apparatus at least to cause a broadcast of the positioning assistance data in a plurality of logical sub-channels via such determined access points only.

14. The apparatus according to claim 10, wherein a respective logical sub-channel is provided for assistance data for at least one of:
 each of a plurality of beacon systems;

each of a plurality of positioning methods;
each of a plurality of update rates;
each of a plurality of types of assistance data; and
each of a plurality of geographic areas.

15. The apparatus according to claim 10, wherein the assistance data comprises data mapping identifiers of access stations providing access to a location assistance service to a respective location.

16. The apparatus according to claim 10, wherein the plurality of logical sub-channels comprise at least one of
a plurality of data files and
a plurality of streams.

17. The apparatus according to claim 10, wherein the plurality of logical sub-channels are realized by using a plurality of transport layer protocol ports.

18. The apparatus according to claim 10, wherein the broadcast using the plurality of logical sub-channels is an internet protocol broadcast.

19. The apparatus according to claim 10, wherein the apparatus is one of
a server further comprising an interface configured to provide a link to a wireless communication network and
a network element of a wireless communication network.

20. A non-transitory computer readable storage medium, comprising: stored computer program code, the computer program code when executed by a processor, cause an apparatus to perform:
causing a broadcast of positioning assistance data in a plurality of different logical sub-channels, wherein the positioning assistance data has been distributed to the plurality of different logical sub-channels depending on its content such that a respective different logical sub-channel is provided for at least one of:
orbit and clock models as broadcast by satellites of at least one global navigation satellite system and high-accuracy orbit and clock models;
each of a plurality of regional ionosphere models and one of an ionosphere model as broadcast by satellites of at least one global navigation satellite system and ionosphere maps for continent-wide models;
a cell identifier database for a first country and a cell identifier database for a second country; and
each of a plurality of service quality levels of the assistance data, wherein different service quality levels include at least one of different accuracies and different resolutions of the assistance data.

* * * * *